United States Patent Office 3,110,653
Patented Nov. 12, 1963

3,110,653
IRRADIATIVE HYDROXYLATION OF BENZENIC HYDROCARBONS IN THE AQUEOUS PHASE
Roger Montarnal, Montesson, and Jacques Prévé, Grenoble, France, assignors to Institut Français du Petrole, des Carburants et Lubrifiants, and Commissariat a l'Energie Atomique, both of Paris, France
No Drawing. Filed May 26, 1960, Ser. No. 31,835
Claims priority, application France May 28, 1959
17 Claims. (Cl. 204—154)

The present invention relates to an improved process for hydroxylation of benzenic hydrocarbons by radiolysis, in the presence of oxygen, of a solution of the same into water or oxygenated water, characterized by the addition to said solution of radiolysis sensitizers, the action of which results in a considerable increase of the yield in hydroxylated product per energy unit absorbed by the treated solution.

Hydroxylation of certain hydrocarbons by radiolysis of their aqueous solution was already known in the art, (see Burton Milton and P. V. Phung: "Radiolyses of Aqueous Solutions of Hydrocarbons," Radiation Research 7, 199, 216, 1957) but the yields obtained were so low that the carrying out of these processes on an industrial scale could not be envisaged even when the energy of irradiation is obtained at the lowest cost, which is the case, for example, when irradiating with radiations produced by an atomic pile.

It is an object of our invention to manufacture in a very simple manner hydroxylated derivatives of benzenic hydrocarbons by irradiating aqueous solutions of the same. It is another object of this invention to carry out said irradiation in such a manner as to substantially avoid the drawback of the conventional irradiating process resulting from the low yield of the radiation energy. It is still another object of this invention to improve the yield of hydroxylated products obtained by radiolysis of benzenic hydrocarbons, by substantially increasing the amount of energy absorbed by the aqueous solutions of said hydrocarbons.

It is a further object of our invention to multiply by a considerable factor the rate of conversion of benzenic hydrocarbons to their hydroxylated derivatives, corresponding to a given amount of energy absorbed in the aqueous solutions of said hydrocarbons.

It is a still further object of our invention to carry out radiolysis of aqueous solutions of benzenic hydrocarbons in such an economical manner as may be used on an industrial scale.

These and further objects as may become apparent from the following description are achieved according to our invention by adding to the aqueous solutions of benzenic hydrocarbons submitted to radiolysis, a small amount of a sensitizer consisting of a metal oxide or sulphide of the semi-conductor type, insoluble in water, said sensitizer being dispersed in the aqueous phase in a finely divided state.

It has been observed according to this invention that the presence of such a sensitizer in the aqueous solution of the treated hydrocarbon results in a considerable improvement of the conversion rate to hydroxylated products as compared to a relatively small increase in the amount of energy absorbed in said aqueous solution. Therefore, the efficiency of the supplemental amount of energy absorbed is far higher than that of the corresponding initial amount of the latter in the absence of a sensitizer.

Such a considerable increase of the irradiation yield is quite unforeseeable, since it was not to be expected that such sensitizers as metal oxides and sulfides, which are known as effective sensitizers for carrying out certain ionic reactions would also be very effective for improving the yield of irradiation in free-radical induced reactions, such as hydroxylation of benzenic hydrocarbons.

In an attempt to explain such unexpected improvement in the yield of irradiation energy provided by the use of said sensitizers, it may be suggested that they induce a formation, by an ionic mechanism, of free radicals which are thereafter used to promote the reaction proceeding according to a free-radical mechanism.

Metal oxides and sulfides of the semi-conductor type used as sensitizers according to the present invention are, for instance, described in "Electronique Industrielle" by G. Goudet, pages 150 et seq., edited by Eyrolles, 1957, as well as in "Introduction to Solid State Physics," by Kittel, edited by John Wiley and Sons, New York, 1957, page 347.

Although any metal oxide and sulfide of the semi-conductor type is effective for carrying out the improvement according to this invention, and particularly those referred to as being of the "n" or "p" type, the preferred sensitizers are $ZnO$, $ZnS$, $NiO$, $ThO_2$, $CuO$, $Co_2O_3$, $TiO_2$ and $ZrO_2$.

The grain size of the metal oxides or sulfides used according to the invention must be small enough to ensure their maintenance in suspension into the aqueous phase with efficient stirring. Accordingly grains of an average thickness of less than 50 microns are preferably used, although grains of a larger thickness may be also effective for obtaining improved results as compared to that achieved by the conventional irradiating process.

According to our invention the amount of water admixed with the treated benzenic hydrocarbon must be sufficient for dissolving the latter. Consequently, the proportion of hydrocarbon in the reaction medium is preferably lower than the maximum amount of said hydrocarbon which may be dissolved therein. However, it is still possible with efficient stirring means to use greater amounts of hydrocarbon even in a batch process, since the hydroxylated compound is generally more soluble in water than the hydrocarbon. The hydrocarbon excess is progressively dissolved in replacement of the portion of the same which is consumed by conversion to the hydroxylated product. Such excess is unnecessary when carrying out the process in a continuous manner, since complementary amounts of hydrocarbon may be continuously forwarded to the reaction medium during the conversion to hydroxylated derivatives, so as to substantially compensate the hydrocarbon consumption.

Due to the low solubility of benzenic hydrocarbons in water, large amounts of the latter must be used according to the invention. However, the solubility of the hydroxylated derivative is frequently at least two or three times greater than that of the corresponding hydrocarbon and permits to obtain a solution of a much higher content in hydroxylated product than in hydrocarbon. However, too high concentrations of the hydroxylated compound in the aqueous phase, as compared to that of hydrocarbon would be detrimental to the conversion yield of the benzenic hydrocarbon to the hydroxylated derivative.

Practically it will be convenient to use hydrocarbon in amounts of 2 to 3 times that quantity which will suffice to saturate the aqueous phase, when the solubility of the hydroxylated derivative in water is sufficient to ensure dissolution of the total amount of said derivative formed during the reaction.

The treatment according to the present invention may be applied either to benzene or to alkyl benzenes, preferably selected among those which are in the liquid state at the ambient temperature.

According to said conditions the treatment of hydroxylation according to our invention is preferably limited to benzene or to mono- and di-alkylbenzenes the alkyl substituents of which contain a maximum of 6 carbon atoms, and particularly to monoalkylbenzenes fulfilling said condition or to dialkylbenzenes in which each of the two alkylsubstituents contains less than 5 carbon atoms in its molecule.

As examples of such benzenic hydrocarbons which may be advantageously treated according to the process of our invention in the form of their aqueous solutions are to be mentioned: benzene, toluene, xylenes, ethylbenzene and cumene.

The aqueous phase of the benzenic hydrocarbon must be brought to a basic pH in the vicinity of 12 and comprised, for instance, between 11 and 13, prior to the treatment by radiations, by having added thereto an appropriate small amount of a strong mineral base, such as for example soda or potash.

The radiolysis process will thus result in the formation of a basic derivative of the benzenic hydrocarbon treated, which derivative is further converted to the hydroxylated product by acidification of the reaction mixture with, for instance, a strong mineral acid, such as hydrochloric or sulfuric acid.

The hydroxylated product present in the aqueous phase may be identified in laboratory when dealing with small amounts of benzenic hydrocarbon, by spectrophotometry analysis. In the case of conversion of benzene to phenol, the latter is identified by its absorption at 288 m$\mu$ in a basic medium NaOH N/10. The phenol content of the solution may be calculated from the optical density of the latter. When dealing with larger amounts of benzenic hydrocarbons, the hydroxylated product is advantageously extracted from its aqueous solution by any of the separating methods known in the art, such as fractional distillation, azeotropic distillation, selective extraction by means of an appropriate solvent such as ether or a hydrocarbon solvent, such as hexane or benzene, fractional crystallization and the like.

Among the various types of radiation which may be used for carrying out this invention are particularly to be mentioned: X rays, accelerated electrons, ultraviolet rays (obtained either from a lamp or from sunlight) $\gamma$ rays or radiations produced by an atomic pile.

The auto radiolysis yield of the semi-conductor metal oxide or sulfide used as sensitizer according to this invention, i.e. the yield improvement in hydroxylated product attributable to the presence of said sensitizer, may be calculated according to the following formula:

$$G_R = 100 \cdot \frac{Vs - Vo}{Es - Eo}$$

wherein $G_R$ represents the auto radiolysis yield of the sensitizer or yield improvement in the production of the hydroxylated product resulting from the use of said sensitizer, $Vs$ is the reaction velocity or production rate in the presence of the sensitizer, $Vo$ is the reaction velocity or production rate without using a sensitizer, $Es$ is the amount of energy absorbed by the irradiated aqueous solution of benzenic hydrocarbon having added thereto a given quantity of sensitizer, and $Eo$ is the amount of energy absorbed by the irradiated solution in the absence of any sensitizer.

When $Es$ and $Eo$ are expressed in röntgens/minute and $Vs$ and $Vo$ in $10^{-11}$ gram molecule per gram of the aqueous solution and per second, said above-mentioned formula may be written as follows:

$$G_R = \frac{100}{60} \times \frac{(Vs-Vo)6.02 \times 10^{12}}{(Es-Eo)52 \times 10^{12}} = 694.6 \frac{Vs-Vo}{Es-Eo}$$

The amount of energy absorbed by the irradiated liquid ($Eo$) has been determined according to the invention, by chemical relative dosimetry based on the yield of irradiation of an aqueous solution of $SO_4Fe$ which yield G is generally estimated to 15.6 (see Haissinski, "La Chimie Nucléaire et ses Applications," edited by Masson, Paris, 1957, page 334). The corresponding amount of energy absorbed by the irradiated solution containing a sensitizer ($Es$) may be deducted from the values of $Eo$ and of the mass absorption coefficients of the type of sensitizer used (which coefficients are published for instance in "The Atomic Nucleus," by Evans, page 699, edited by McGraw-Hill Book Company, New York, 1955), for a monochromatic radiation having an energy of 200,000 electron-volts.

Accordingly, if a different value X of the irradiation yield of a solution of $SO_4Fe$ was to be adopted, all the values of $Es$ and $Eo$ would have to be divided by the ratio $X/15.6$.

In most cases the irradiation of the benzenic hydrocarbon is carried out at the ambient temperature and under atmospheric pressure. However, it may be of interest, particularly when carrying out the invention on an industrial scale, to operate at higher temperatures and/or superatmospheric pressures. As a matter of fact it has been observed that temperatures of about 150° C. or more frequently favor a considerable increase of the reaction velocity due to the intervention of a chain mechanism. Moreover, such temperatures have also the advantage of providing a better solubility in water of the benzenic hydrocarbon treated than that observed at the ambient temperature.

When operating in an autoclave at elevated temperature, the aqueous solution treated would be kept saturated with oxygen over the whole reaction period by maintaining a partial pressure, for instance of about 5 to 10 kg./cm.$^2$, of gaseous oxygen or air.

In all cases, whatever may be the operating conditions, the gaseous oxygen may always be replaced by air without any disadvantage.

The process of our invention provides conversion of benzenic hydrocarbons to the corresponding hydroxylated products with a very high selectivity of the reaction, giving rise substantially exclusively to the monohydroxylated derivative. Such a selectivity, which constitutes a further advantage of the process according to this invention, is quite surprising in view of the fact that reactions carried out by radiolysis are deemed non-selective.

The benefit of said selectivity of production of the monohydroxylated product is also obtainable under the operating conditions securing the highest conversion rate per hour, for instance by using an accelerator as source of radiation.

The general operating conditions here above described are illustrated by the following comparative examples relative to hydroxylation of benzene and toluene to phenol and cresols respectively, which examples are not to be considered as limitative in any sense of the invention and particularly of the kind of benzenic hydrocarbon treated, of the type of semi-conductor metal oxide or sulfide used as sensitizer or of the specific operating conditions used.

*Example 1*

Into an irradiation cell, 160 milliliter of an aqueous basic solution (NaOH N/100), saturated with both oxygen and benzene (0.80 gram per liter), are irradiated at ambient temperature, by means of X rays provided by an apparatus of the medical type (Securix–22–12 manufactured by "Compagnie Générale de Radiologie," Paris) under such conditions that the dose absorbed in the cell is of 2000 röntgens/minute for X rays of 200,000 volts.

Phenol is produced at a rate of $8.7 \times 10^{-11}$ gram molecule per gram of solution and per second, corresponding to the formation of $52 \times 10^{12}$ small molecules per second. The amount of energy absorbed by the solution is of 2000/60 röntgens/second, i.e.

$$\frac{2000}{60} \times 52 \times 10^{12}$$

electron-volts/second. There are thus formed 60/2000 small molecules per electron-volt absorbed in the solution, which corresponds to 3 small molecules per 100 electron-volts. The irradiation yield $$G_o = \frac{V_o}{E_o}$$

expressing the number of small molecules formed for each 100 electron-volts, is consequently of 3.

*Example II*

Example I is repeated but with an aqueous solution having added thereto 6 grams of NiO. Phenol is thus produced at a rate of $12.8 \times 10^{-11}$ gram molecule per gram of solution and per second. The amount of energy absorbed in said solution reaches 2087 röntgens/minute. The irradiation yield $$G_s = \frac{V_s}{E_s}$$

expressing the ratio of the production rate of phenol in the presence of a sensitizer to the corresponding amount of energy absorbed in the solution, becomes equal to 4.3, which means that 4.3 small molecules of phenol are formed for each 100 electron-volts absorbed in the solution. The yield improvement $G_R$ as hereabove defined is thus equal to 33.

*Example III*

Example I is repeated with an aqueous solution having added thereto 10 grams of NiO. The phenol is thus formed at a rate of $15.3 \times 10^{-11}$ gram molecules per gram of the solution and per second with an amount of energy absorbed of 2145 röntgens/minute, which corresponds to a yield $G_S$ equal to 5 and a yield improvement $G_R$ of 32.

*Example IV*

Example I is repeated with an aqueous solution having added thereto 20 grams of NiO. Phenol is thus produced at a rate of $22.3 \times 10^{-11}$ gram molecules per gram of the solution and per second with an amount of energy absorbed of 2290 röntgens/minute, which corresponds to a yield $G_S$ of 6.8 and a yield improvement, due to the specification of the sensitizer, of 33.

According to the 3 preceding examples in which the same sensitizer (NiO) is used, the yield improvement attributable to said sensitizer remains stable whatever may be the amount of said sensitizer employed. It appears consequently that the increase in the rate of formation of phenol attributable to the sensitizer is proportional to the amount of sensitizer used, which also implies a proportionality relation with the increment in energy absorbed.

*Example V*

Example II is repeated except that NiO is replaced by an equal weight of $ThO_2$. Phenol is thus formed at a rate of $18.3 \times 10^{-11}$ gram molecules per gram of solution and per second with an amount of energy absorbed of 2518 röntgens/minute, which corresponds to a yield $G_S$ of 5 and a yield improvement $G_R$ of 13.

*Example VI*

The same rate of formation of phenol as in Example V ($18.3 \times 10^{-11}$ gram molecules per gram of solution and per second) is obtained by using 6 grams of $Co_2O_3$ as sensitizer, added to the aqueous solution, the amount of energy absorbed being of 2081 röntgens/minute, which corresponds to a yield $G_S$ of 6.1 and a yield improvement $G_R$, attributable to the sensitizer, of 82.

*Example VII*

Example II is repeated except that NiO is replaced by an equal amount of CuO. The rate of formation of phenol is thus of $16.6 \times 10^{-11}$ gram molecules per gram of solution and per second with an amount of energy absorbed of 2093 röntgens/minute, which corresponds to a yield $G_S$ of 5.5 and a yield improvement $G_R$ of 59.

*Example VIII*

Example II is repeated except that NiO is replaced by an equal amount of $TiO_2$. The production rate of phenol is thus equal to $15.4 \times 10^{-11}$ gram molecules per gram of solution and per second, which corresponds to an irradiation yield $G_S$ of 5.2 and to a yield improvement $G_R$ attributable to the sensitizer equal to 63.

*Example IX*

Example I is repeated with an aqueous solution having added thereto 2 grams of ZnO. Phenol is thus produced at a rate of $10.6 \times 10^{-11}$ gram molecules per gram of solution and per second, with an amount of energy absorbed of 2025 röntgens/minute, which corresponds to a yield $G_S$ of 3.6 and a yield improvement $G_R$ of 53.

*Example X*

Example I is repeated with an aqueous solution having added thereto 30 grams of ZnO. The rate of production of phenol thus reaches $34 \times 10^{-11}$ gram molecules per gram of solution and per second with an amount of energy absorbed of 2375 röntgens/minute, which corresponds to a yield $G_S$ of 10 and a yield improvement $G_R$ of 47.

*Example XI*

Example I is repeated with an aqueous solution having added thereto 1 gram of ZnS. The rate of production of phenol is thus of $9.2 \times 10^{-11}$ gram molecules per gram of solution and per second with an amount of energy absorbed of 2016 röntgens/minute, which corresponds to a yield $G_S$ of 3.2 and a yield improvement $G_R$ of 22.

*Example XII*

Example I is repeated with an aqueous solution having added thereto 8 grams of ZnS. The rate of phenol production thus reaches $13 \times 10^{-11}$ gram molecules per gram of solution and per second with an energy absorbed of 2125 röntgens/minute. The yield of radiolysis $G_S$ is thus of 4.25 and the yield improvement $G_R$ of 24.

*Example XIII*

Example I is repeated with an aqueous solution having added thereto 10 grams of ZnS. The rate of phenol formation is thus of $13.6 \times 10^{-11}$ gram molecules per gram of solution and per second, with an amount of energy absorbed of 2156 röntgens/minute, which corresponds to a yield $G_S$ of 4.4 and a yield improvement $G_R$ of 22.

*Example XIV*

Example I is repeated with an aqueous solution having added thereto 4 grams of $ZrO_2$. The rate of production of phenol is thus of $11.8 \times 10^{-11}$ gram molecules per gram of solution and per second, with an energy absorbed of 2113 röntgens/minute, which corresponds to a yield $G_S$ of 3.9 and a yield improvement $G_R$ of 19.

*Example XV*

160 milliliters of the same solution as described in Example I are submitted to ultraviolet rays. No formation of phenol is obtained, which results from the fact that the water of the aqueous solution of benzene does not absorb ultraviolet radiations.

*Example XVI*

Example XV is repeated with an aqueous solution of benzene further containing 1 gram of $TiO_2$ acting as sensitizer. Phenol is thus formed at a rate of 6 milligrams per liter of solution and per hour. This rate of production of phenol remains unchanged when using larger amounts of $TiO_2$, which tends to demonstrate that the entirety of the ultraviolet radiations has been absorbed by the sensitizer.

Example XVII

Example XV is repeated with an aqueous solution of benzene having added thereto 0.25 gram of ZnO acting as a sensitizer. Phenol is thus formed at a rate of 80 milligrams per liter of solution and per hour. This rate of production of phenol remains unchanged when using larger amounts of ZnO. A comparison of the three preceding examples leads to the conclusion that the action of the sensitizer is attributable to absorption of radiation energy by the latter. This is in complete agreement with the relation of proportionality observed between the amount of sensitizer used and the rate of formation of the hydroxylated product.

Example XVIII

In an irradiation cell, 160 milliliters of an aqueous basic solution (NaOH N/100), saturated with both oxygen and toluene (0.50 gram per liter), are irradiated at ambient temperature, by means of X rays, provided by an apparatus of the medical type (Securix 22–12), under such conditions that the dose absorbed in the cell is of 2000 röntgens/minute for X rays of 200,000 volts. There are so produced cresols (divided into about 25% of ortho-, 50% of meta-, and 25% of para-cresol) at a rate of $5.8 \times 10^{-11}$ gram molecules per gram of solution and per second, which corresponds to a yield of irradiation $G_o$ of 2.01.

Similar results have been obtained when substituting N/10 and N/1000 KOH solutions for the same volume of N/100 NaOH solution.

Example XIX

Example XVIII is repeated but with an aqueous solution further containing 10 grams of NiO. Cresols are thus formed at a rate of $11.6 \times 10^{-11}$ gram molecules per gram of solution and per second with an amount of energy absorbed of 2.145 röntgens/minute, which corresponds to a yield $G_S$ of 3.75 and a yield improvement, due to the action of the sensitizer: $G_R = 28$.

Example XX

Example XVIII is repeated with an aqueous solution having added thereto 6 grams of $TiO_2$ cresols are thus produced at a rate of $10.6 \times 10^{-11}$ gram molecules per gram of solution and per second with an amount of energy absorbed of 2074 röntgens/minute, which corresponds to a yield $G_S$ of 3.6 and a yield improvement $G_R$ of 45.

Example XXI

Example XVIII is repeated with a solution further containing 2 grams of ZnO. Cresols are thus produced at a rate of $7.3 \times 10^{-11}$ gram molecules per gram of solution and per second, with an amount of energy absorbed of 2025 röntgens/minute, which corresponds to a yield of irradiation $G_S$ of 2.5 and a yield improvement $G_R$ of 42.

Example XXII

Example XVIII is repeated but with an aqueous solution having added thereto 10 grams of ZnS. The rate of formation of cresols thus reaches $10.1 \times 10^{-11}$ gram molecules per gram of solution and per second with a quantity of energy absorbed of 2156 röntgens/minute which corresponds to a yield $G_S$ of 3.3 and a yield improvement $G_R$ of 19.

The above examples show that in any case the use of a sensitizer, even in small proportions, results in a very significant increase of the yield of irradiation by means of either X rays or ultraviolet radiations.

It is also apparent therefrom that the yield improvement $G_R$, due to the action of the sensitizer, is a specific characteristic of the latter since the value of $G_R$ is only dependent from the value of the sensitizer used but, for a given sensitizer, is substantially independent from the amount of the latter employed.

Accordingly the use of a sensitizer even in very small amounts of, for instance, less than 1 percent, is sufficient for providing the benefit of the yield improvement $G_R$ while on the contrary the use of higher radiation doses does not result in any increase of the irradiation yield $G_o$ or $G_S$ (in the presence of a given amount of sensitizer) which implies a proportionality relation between the reaction rate and the amount of energy absorbed.

Naturally, the above-mentioned sensitizers may also be used for improving the yield of irradiation by means of $\gamma$ rays or accelerated electrons, as shown in the following example:

Example XXIII

An aqueous basic solution (NaOH 0.05 N), saturated with benzene and further containing NiO, acting as a sensitizer, in proportion of 125 grams per liter of solution, is irradiated at the ambient temperature in the presence of oxygen, by means of an accelerator, so adjusted as to provide the absorption of a power of 50 watts in the liquid phase. Said solution is kept saturated with benzene during the course of the reaction by means of a continuous feeding with the same. When proceeding in a continuous manner, with a feeding rate of the aqueous solution so adjusted as to provide an average irradiation duration of 2 minutes, phenol is produced at a rate of 3 kilograms per m.$^3$ of the treated solution. After acidification of the solution with HCl, the thus obtained phenol is separated by extraction with ether.

While there have been described in detail certain forms of the invention it must be understood that the latter is susceptible to modifications or variations without departing from the spirit of this disclosure and the scope of the appended claims.

What we claim is:

1. A process for hydroxylating a benzenic hydrocarbon consisting, in a first stage, of submitting to ionizing radiations an aqueous solution of said hydrocarbon, previously brought to a pH value of about 11 to 13 by addition thereto of a small amount of a mineral base, said solution being substantially saturated with oxygen, in the presence of a semiconductor selected from the group consisting of ZnO, ZnS, NiO, ThO$_2$, CuO, Co$_2$O$_3$, TiO$_2$ and ZrO$_2$, and, in a second stage, of acidifying said aqueous solution thereby converting the compound obtained at the end of the first stage to the coresponding hydroxylated product.

2. A process according to claim 1, wherein the semiconductor is NiO.

3. A process according to claim 1, wherein the semiconductor is ZnO.

4. A process according to claim 1, wherein the semiconductor is Co$_2$O$_3$.

5. A process according to claim 1, wherein the semiconductor is CuO.

6. A process according to claim 1, wherein the semiconductor is TiO$_2$.

7. A process as claimed in claim 1, wherein the benzenic hydrocarbon is benzene.

8. A process as claimed in claim 1, wherein the benzenic hydrocarbon is toluene.

9. A process according to claim 1 wherein the ionizing radiations are X rays.

10. A process according to claim 1 wherein the ionizing radiations consist of accelerated electrons.

11. A process according to claim 1 wherein the ionizing radiations are gamma rays.

12. A process according to claim 1 wherein the ionizing radiations are those obtained from an atomic pile.

13. A process according to claim 1 wherein the ionizing radiations are ultraviolet rays.

14. A process according to claim 1 wherein the hydrocarbon is used in excess to the maximum amount of the same which may be dissolved in said aqueous solution.

15. A process for hydroxylating benzenic hydrocarbons corresponding to the formula:

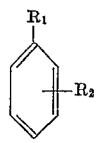

wherein $R_1$ and $R_2$ are selected from the group consisting of hydrogen and alkyl radicals having no more than 6 carbon atoms in the molecule, consisting in a first stage of submitting an aqueous solution of such a hydrocarbon, previously brought to a pH value of the order of 11 to 13 by addition thereto of a small amount of a mineral base, and saturated with oxygen, to ionizing radiations in the presence of a semi-conductor selected from the group consisting of ZnO, ZnS, NiO, $ThO_2$, CuO, $Co_2O_3$, $TiO_2$, and $ZrO_2$ and, in a second stage, of acidifying said aqueous solution so as to convert the basic compound obtained at the end of the first stage to the corresponding hydroxylated product.

16. A process according to claim 15, wherein the semi-conductor selected from the group consisting of ZnO, ZnS, NiO, $ThO_2$, CuO, $Co_2O_3$, $TiO_2$, and $ZrO_2$ is a semi-conductor metal oxide.

17. A process according to claim 15, wherein the semi-conductor selected from the group consisting of ZnO, ZnS, NiO, $ThO_2$, CuO, $Co_2O_3$, $TiO_2$, and $ZrO_2$ is a semi-conductor metal sulfide.

References Cited in the file of this patent
UNITED STATES PATENTS

| | | |
|---|---|---|
| 2,953,509 | Ruskin | Sept. 20, 1960 |
| 3,067,115 | Clingman | Dec. 4, 1962 |

OTHER REFERENCES

Radiation Research, volume 7 (1957), pages 199–216.